April 8, 1969     E. K. JONES     3,437,705
PROCESS FOR AROMATIC ALKYLATION AND OLEFINIC OLIGOMERIZATION
Filed March 2, 1967
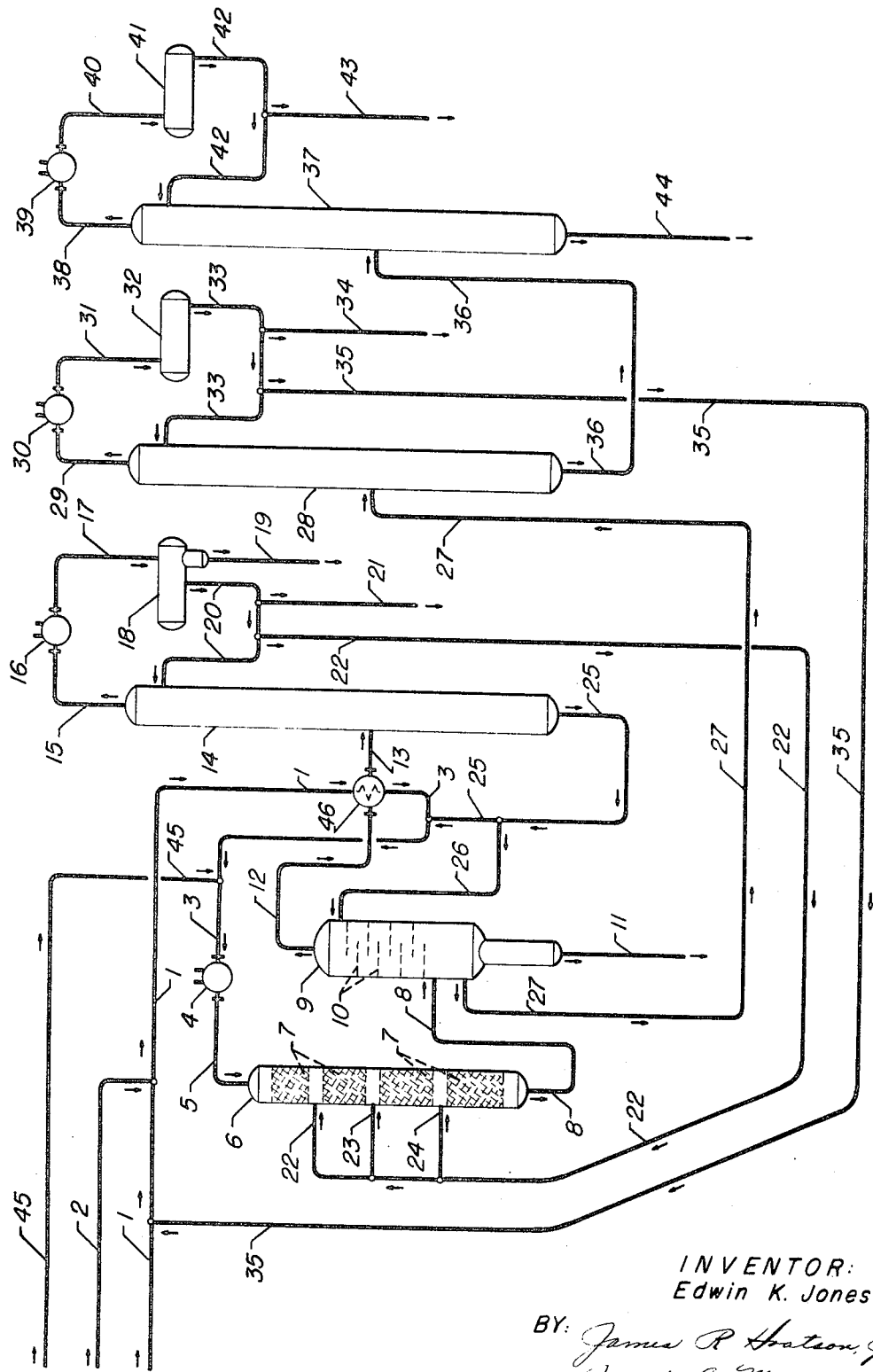
INVENTOR:
Edwin K. Jones
BY: James R. Hoatson, Jr.
Joseph E. Mason, Jr.
ATTORNEYS United States Patent Office 3,437,705
Patented Apr. 8, 1969

3,437,705
PROCESS FOR AROMATIC ALKYLATION AND
OLEFINIC OLIGOMERIZATION
Edwin K. Jones, Kenilworth, Ill., assignor to Universal
Oil Products Company, Des Plaines, Ill., a corporation
of Delaware
Filed Mar. 2, 1967, Ser. No. 620,178
Int. Cl. C07c 3/50, 3/02, 7/04
U.S. Cl. 260—671                10 Claims

ABSTRACT OF THE DISCLOSURE

A process for alkylating an alkylatable aromatic compound with a molar deficiency of olefin-acting compounds, in the presence of an unreactive vapor diluent. The reaction effluent is passed into a rectified flash zone under conditions sufficient to separate the diluent and a part of unreacted alkylatable aromatic compound from the alkylated aromatic product. At least a portion of unreacted alkylatable aromatic compound is returned to the alkylation zone and the alkylated aromatic product is recovered in high concentration. The process is equally applicable to the oligomerization of an olefin-acting compound in the presence of an unreactive vapor diluent where at least a portion of partially-oligomerized product is returned to the oligomerization zone. Specific application of the process is in the synthesis of ethylbenzene, cumene, propylene-trimer, and propylene-tetramer.

---

The present invention relates to the alkylation of an alkylatable aromatic compound with an olefin-acting compound. The present invention also relates to the oligomerization of olefin-acting compounds. More specifically, the present invention relates to the alkylation of an aromatic hydrocarbon with an olefinic hydrocarbon in the presence of other hydrocarbon vapor which is unreactive at the process conditions utilized, and to the oligomerization of olefinic hydrocarbons in the presence of unreactive hydrocarbon vapor. Most particularly the present invention relates to an improved process for alkylation of benzene with a propylene-propane mixture, for the alkylation of benzene with an ethylene-ethane mixture, and for the oligomerization of propylene in a propylene-propane mixture.

The present invention finds one broad application in the production of alkylated aromatic hydrocarbons for use in subsequent chemical synthesis. The present invention particularly finds application in the production of isopropyl-benzene, or cumene, which is utilized in the synthesis of phenol, acetone, alpha-methylstyrene, and acetophenone. These cumene-derived chemicals are intermediates in the synthesis of resins for plastics and nylon. A further application of the inventive process is in the synthesis of ethylbenzene. Virtually all of the ethylbenzene commercially produced is dehydrogenated to styrene monomer, although small quantities are used as solvents and as intermediates in the synthesis of other chemicals. Ethylbenzene-derived styrene finds utility in the synthesis of polyester resins, polystyrene and other plastics, as well as in the synthesis of styrene-butadiene rubber and in the formulation of coatings including latex paints. Application of the inventive process may also be found in the alkylation of substituted aromatics such as phenol, which when alkylated with isobutylenes forms O-tertiarybutylphenol which is an intermediate in the synthesis of other chemicals, and forms p-tertiarybutyl-phenol which is used to modify phenolformaldehyde resins. A further application of the inventive process upon substituted aromatic hydrocarbons may be found in the alkylation of para-hydroxyanisole with tertiary butyl alcohol or isobutylene to form butylated hydroxyanisole which finds utility as an antioxidant in the preservation of foods.

The present invention finds additional application in the oligomerization of olefin-acting compounds. Oligomerization of propylene may be undertaken to produce commercial fractions of propylene-trimer and propylene-tetramer, within the scope of the inventive process. Trimer finds utility in the synthesis of nonyl-phenol detergents and in the synthesis of decyl alcohols by the Oxo Process. Tetramer is also used in the synthesis of detergents. (It is to be noted that the oligomerization of olefin hydrocarbons is more commonly deferred to as "polymerization of olefins" in the petroleum refining industry.)

It is a broad object of this invention to produce oligomers of olefin-acting compounds. It is a further broad objective of this invention to produce alkylated aromatic compounds and more particularly mono-alkylated aromatic compounds. It is a particular object to produce monoalkylated benzene hydrocarbons by the practice of an improved alkylation process. It is also a particular object to produce oligomers of olefin-acting compounds by the practice of an improved oligomerization process. It is a specific object of this invention to produce ethylbenzene, cumene, propylene-trimer, and propylene-tetramer in a more economical and facile manner.

These and other objectives may be readily ascertained from the following description and the attached drawing which is a simplified flow diagram setting forth one specific embodiment of the invention.

In accordance with the practice of this invention, one embodiment comprises alkylating an alkylatable aromatic compound with a molar deficiency of olefin-acting compound in a reaction zone in the presence of an unreactive vapor diluent, passing the total alkylation effluent into a rectified flash zone under conditions sufficient to separate said diluent and a part of unreacted alkylatable aromatic compound from alkylated aromatic compound, returning at least a portion of unreacted alkylatable aromatic compound to the reaction zone, and recovering alkylated aromatic compound in high concentration.

A further embodiment of the inventive process comprises oligomerizing an olefin-acting compound in a reaction zone in the presence of unreactive vapor diluent, passing the total oligomerization effluent into a rectified flash zone under conditions sufficient to separate said diluent and a part of partially-oligomerized product from oligomerized product, returning at least a portion of partially-oligomerized product to the reaction zone, and recovering oligomerized product in high concentration.

These and other more specific embodiments will be more clearly set forth hereinafter.

Many aromatic compounds are utilizable as alkylatable aromatic compounds within the process of this invention. The preferred aromatic compounds are aromatic hydrocarbons but substituted aromatic hydrocarbons are equally suitable. Such aromatic compounds as phenol, cresol, and hydroxyanisole are among the substituted aromatic hydrocarbons which may be alkylated within the scope of this process.

The preferred aromatic hydrocarbons which may be alkylated within this invention are monocyclic aromatic hydrocarbons. These aromatic hydrocarbons include benzene, toluene, ortho-xylene, meta-xylene, para-xylene, ethylbenzene, ortho-ethyltoluene, meta-ethyltoluene, para-ethyltoluene, normal propylbenzene, isopropylbenzene, n-butylbenzene, etc. Higher molecular weight alkyl aromatic hydrocarbons are also suitable as reactants and include aromatic hydrocarbons such as hexylbenzene, nonylbenzene, dodecylbenzene, etc. Other suitable alkylatable aromatic hydrocarbons include those with two or more aryl groups such as diphenyl, diphenylmethane, triphenyl, triphenylmethane, fluorene, stilbene, and so forth. Examples of alkylatable aromatic hydrocarbons within the scope of this invention utilizable as reactants and containing condensed aromatic rings include naphthalene, alkyl-naphthalenes, anthracene, phenanthrene, naphthacene, etc.

Of the alkylatable aromatic hydrocarbons for use within the process of this invention the monocyclic aromatic hydrocarbons are preferred and benzene is particularly preferred.

The olefin-acting compound which may be processed within the inventive process may be selected from diverse materials including mono-olefins, diolefins, polyolefins, acetylenic hydrocarbons, alcohols, ethers and esters. The latter including alkylhalides, alkylsulfates, alkylphosphates, and various esters of carboxylic acids.

The preferred olefin-acting compounds are olefinic hydrocarbons and particularly the mono-olefins. Mono-olefins which are utilized as olefin-acting compounds in the process of the present invention may be either normally gaseous or normally liquid and include ethylene, propylene, 1-butenes, 2-butenes, isobutylene, and higher molecular weight normally liquid olefins such as various pentenes, hexenes, heptenes, etc. Cyclo-olefins such as cyclopentene, methyl-cyclopentene, cyclohexene, methyl-cyclohexene, etc. may also be utilized.

Also included within the scope of the olefin-acting compound are certain substances capable of producing olefinic hydrocarbons or intermediates thereof under the conditions of operation utilized in the process. Typical olefin producing substances or olefin-acting compounds capable of use include alkylhalides capable of undergoing dehydrohalogenation to form olefinic hydrocarbons. Examples of such alkylhalides include ethyl fluoride, ethyl chloride, ethyl bromide, ethyl iodide, n-propyl fluoride, n-propyl chloride, n-propyl bromide, n-propyl iodide, isopropyl fluoride, isopropyl chloride, isopropyl bromide, isopropyl iodide, and other halogen substituted homologs. As also stated hereinabove other esters such as alkyl sulfates including ethyl sulfate, propyl sulfate, etc. and alkyl phosphates including ethyl phosphate, propyl phosphate, etc. may be utilized. Ethers such as diethyl ether, ethylpropyl ether, dipropyl ether, etc. are also included within the generally broad scope of the term "olefin-acting compound." In addition alcohols such as isopropanol, isobutanol, tertiary butyl alcohol, etc. may be successfully utilized as olefin-acting compounds in the process of this invention.

The alkylation of the alkylatable aromatic compound with the olefin-acting compound will be undertaken in the reaction zone in the presence of an alkylation catalyst under suitable operating conditions. The operating conditions of temperature, pressure and reaction time will vary depending upon the composition of the catalyst and the type of olefin-acting compound and alkylatable aromatic compound being processed. The acid-acting catalyst may be selected from various materials such as sulfuric acid, phosphoric acid, hydrogen fluoride, aluminum chloride, aluminum bromide, boron trifluoride, ferric chloride, zinc chloride, zirconium chloride, various synthetically prepared cracking catalysts, such as silica-alumina, silica-alumina-zirconia, silica-magnesia, and various acid-acting clays including activated alumina, A particularly preferred catalyst which is utilized for the alkylation of aromatics within the practice of this invention is solid phosphoric acid catalyst which is a calcined composite of phosphoric acid and a siliceous absorbent. Another preferred catalyst utilized for alkylation of aromatics within the inventive process comprises a complex of boron trifluoride with alumina.

The oligomerization of olefin-acting compounds is also undertaken in the reaction zone in the presence of an acid-acting catalyst. Suitable operating conditions of temperature, pressure, and residence time will vary depending upon the specific catalyst being used and the type of olefin-acting compound being reacted. The acidic catalysts which have been defined hereinabove for the alkylation of aromatic compounds with olefin-acting compounds are equally effective for the oligomerization of olefin-acting compounds. A particularly preferred catalyst which is utilized for the oligomerization of olefin-acting compounds within the practice of this invention is solid phosphoric acid catalyst which is a calcined composite of phosphoric acid and a siliceous absorbent.

An understanding of the present invention may now be readily obtained by referring to the accompanying drawing which sets forth a simplified flow for carrying out one specific embodiment of the invention In a process for the manufacture of cumene, fresh benzene is introduced via line 1 at the rate of 156.1 mols per hour at 100° F. This benzene stream contains 0.3 mol per hour of non-aromatic hydrocarbons, and a recycle benzene stream is combined with the fresh benzene by introduction into line 1 from line 35 at the rate of 806.5 mols per hour at 100° F. This total benzene feed comprising 962.6 mols per hour is then mixed with an olefin feed entering line 1 via line 2 at the rate of 301.3 mols per hour at 100° F. The olefin feed stream contains 156.2 mols per hour of propylene and the balance of this stream comprises propane. The total combined feed passes via line 1 at a total rate of 1263.9 mols per hour and enters a feed effluent heat exchanger 46 wherein it is heated from 100° F. to 350° F. The heated combined feed stream is then augmented with a second recycle benzene stream which enters via line 25 at the rate of 428.3 mols per hour and at a temperature of 410° F. The total hot feed stream continues via line 3 and a water injection stream is introduced therein via line 45 at the rate of 0.7 mol per hour. The feed stream then enters a heat exchanger 4 wherein the temperature of the stream is raised from 377° F. to 415° F.

The total combined feed of 1692.2 mols per hour enters reaction chamber 6 at a pressure of 510 pounds per square inch via line 5. Reaction chamber 6 contains multiple catalyst beds 7 which contain a solid phosphoric acid catalyst. As the combined feed of olefin and benzene passes through the catalyst beds the exothermic reaction raises the temperature and in order to maintain the catalyst beds at a preferred temperature, quench propane is introduced between the beds via line 22, line 23, and line 24 at a rate sufficient to provide that the temperature rise through any one bed does not exceed about 20° F. (The distribution of catalyst within the individual beds may be adjusted as set out in U.S. Patent 2,860,173 by E. K. Jones.)

A total reaction effluent of 1756.2 mols per hour of vapor and liquid containing alkylated benzene now leaves reactor 6 via line 8 at 435° F. and 500 pounds per square inch. The effluent stream passes through a pressure control valve in line 8, not shown, and is flashed to a pressure of 285 pounds per square inch and a temperature of 398° F. This flashed stream comprising vapor and liquid enters a rectified flash zone 9.

The rectified flash zone 9 comprises a settling section, or chamber, wherein liquid and vapor may be separated and a rectification section wherein the vapor may be rectified to remove higher boiling vapor constituents. The rectification section may contain fractionation decks 10, or it may contain a packing suitable for effecting mass transfer. The fractionating decks 10 may comprise side-to-side pans, bubble trays, valve trays, sieve decks, etc. Suitable packing which may be used in place of decks comprises Raschig rings, Pall rings, Berl saddles, Intalox saddles, etc. While it is possible to introduce the flashed reactor effluent via line 8 directly into the rectification section, it is preferable that the flashed effluent enter the rectified flash zone 9 directly in the settling chamber below the rectification section. As the vapor of the flashed effluent passes up through the rectification section a reflux stream is introduced via line 26 at a rate of 458.6 mols per hour and at a temperature of 410° F. This reflux rectifies the upflowing vapor and thereby minimizes the amount of cumene vapor that passes overhead from the rectified flash zone.

The rectified vapor leaves the rectified flash zone 9 via line 12 at a rate of 1252.4 mols per hour, at a temperature of 374° F., and at a pressure of 280 pounds per square inch. This stream comprises propane and benzene and is substantially free from cumene and passes via line 12 into the feed effluent exchanger 46 as previously set forth. The vapor stream is cooled therein to 290° F. and passes into a depropanizer column 14 via line 13 at a pressure of 275 pounds per square inch.

The depropanizer column is operated to separate propane and lighter hydrocarbons from benzene and heavier hydrocarbons. A depropanizer overhead vapor leaves the column 14 via line 15 at a rate of 1043.4 mols per hour and at a temperature of 130° F. This vapor passes through condenser 16 and is cooled to 100° F. before passing via line 17 into the overhead receiver 18 at a pressure of 250 pounds per square inch. The liquid within receiver 18 is separated into a hydrocarbon phase and into an aqueous phase, and the separated water is removed from the process via line 19 at a rate of 0.7 mol per hour. The hydrocarbon is removed from receiver 18 via line 20 at a rate of 1042.7 mols per hour. A part of this stream is withdrawn via line 21 as a net propane product of 144.2 mols per hour. A second part of this stream is withdrawn via line 22 and passed to reactor 7 to provide the required quench streams for temperature control of the catalyst beds as set forth hereinabove. This quench stream comprises 220.6 mols per hour. The balance of the hydrocarbon continues in line 20 to provide a reflux to the depropanizer column at the rate of 677.9 mols per hour.

A bottoms stream comprising benzene and having substantial freedom from cumene leaves the depropanizer column 14 via line 25 at the rate of 886.9 mols per hour. This stream is split into two portions. A first portion passes via line 26 at a rate of 458.6 mols per hour to provide reflux to the rectified flash zone 9 as previously set forth. The second portion comprising 428.3 mols per hour is introduced into line 3 via line 25 as a hot recycle benzene stream to provide additional feed for return to the reactor as previously set forth above.

The liquid which collects in the settling section of rectified flash zone 9 is separated therein into a hydrocarbon phase and an aqueous phase. The aqueous phase comprises a phosphoric acid solution which results because the aromatic charge of the process extracts phosphoric acid from the phosphoric acid catalyst within the reactor. This concentrated phosphoric acid is removed from the rectified flash zone via line 11 and sent to a disposal system not shown. The phosphoric acid withdrawal rate during a normal operation is normally less than 1 gallon per day.

The hydrocarbon liquid is removed from the settling chamber of the rectified flash zone 9 via line 27 at a rate of 962.4 mols per hour and a temperature of 390° F. This hydrocarbon stream comprising benzene, cumene, and polyalkylated aromatics passes through a pressure control valve, not shown, wherein its pressure is reduced from 285 pounds per square inch to 15 pounds per square inch and the temperature is reduced from 390° F. to 250° F. This flashed vapor and liquid stream is introduced into a benzene column 28 via line 27.

The benzene column 28 functions to separate benzene from alkylated benzene. A benzene overhead vapor is removed from column 28 via line 29 at the rate of 1434.0 mols per hour and at a temperature of 230° F. This vapor stream passes into condenser 30 wherein it is cooled to 105° F. The condensed benzene stream then passes via line 31 into a receiver 32. The liquid hydrocarbon is withdrawn from the receiver via line 33 and is separated into three portions. A first portion is withdrawn from line 33 via line 34 at the rate of 6.6 mols per hour and comprises benzene and non-aromatic contaminants which have been introduced in the process with the fresh benzene and with the olefin feed. A second portion is withdrawn from line 33 at the rate of 806.5 mols per hour and comprises a cold benzene recycle stream which is sent back to the reactor section via line 35 and introduced into line 1 as previously set forth. The third portion continues in line 33 at the rate of 620.9 mols per hour and is introduced into the benzene column 28 as reflux. A bottoms stream is removed from the benzene column via line 36 at the rate of 149.3 mols per hour and at a temperature of 385° F.

The bottoms stream from the benzene column comprises monoalkylated benzene, or cumene, and polyalkylated benzene and is introduced into a cumene column 37. This column separates cumene from the polyalkylated benzene. The overhead vapor is withdrawn from the column via line 38 at a rate of 318.2 mols per hour and at a temperature of 325° F. This vapor stream is condensed in a condenser 39 and is passed into receiver 41 via line 40 at a temperature of 150° F. The liquid cumene is withdrawn from the receiver via line 42 and a portion comprising 179.2 mols per hour is introduced into the top of the cumene column via line 42 as reflux. A net cumene product is withdrawn from line 42 via line 43 at the rate of 139.0 mols per hour and upon cooling to 100° F. is sent to product storage. This cumene product comprises a purity of 99.8 mol percent. The polyalkylated benzene is removed from the bottom of the cumene column 37 via line 44 at a temperature of 435° F. Upon cooling to 100° F. this bottoms stream of polyalkylated benzene is sent to storage at the rate of 10.3 mols per hour.

Several important advantages of the inventive process may be ascertained from the foregoing process description.

In the prior art manufacture of cumene, the hot effluent vapor and liquid passes directly from the reactor through the feed effluent exchanger 46, and due to the resulting cooling the phosphoric acid which has been leached from the catalyst is readily removed in a subsequent knockout drum. Since the acid must pass through the feed effluent exchanger 46 this exchanger in the prior art process must be of stainless steel or other corrosion resistant alloy. In the inventive process, however, flashing of the effluent provides sufficient cooling to allow concentrated acid to be removed from the rectified flash zone lower chamber while excess water vapor is removed overhead. Since the acid no longer passes through the exchanger tubes, the feed effluent exchanger 46 can be fabricated of carbon steel in the inventive process.

It must further be noted that the depropanizer and benzene columns of the inventive process are smaller than what must be used in the prior art since the depropanizer column no longer must process all benzene, cumene, and polyalkylated benzene in order to depropanize the effluent. In addition, the benzene column no longer must process all benzene in order to remove the alkylbenzenes before recycling the benzene to the reactors, since a part of the benzene has previously been passed to the depropanizer column. Both columns therefore have vapor loads which are substantially half of the prior art loading and both columns are reduced in size accordingly.

The utilization of the rectified flash zone 9 in the inventive process has a further advantage over the prior art in that virtually no cumene is recycled to the reactor. A prior attempt to reduce the depropanizer and benzene column size by utilization of a simple flash chamber resulted in excessive cumene carry-over to the depropanizer column in the flash overhead. When the depropanizer bottoms was thereafter recycled to the reactor it therefore carried a considerable amount of cumene. The cumene then entered the reactor in conjunction with the fresh olefin and became alkylated to provide excessive polyalkylated benzene. The cumene column bottoms stream of line 44 therefore became excessive and the yield of cumene product from the process was reduced. By the inventive process of rectifying the flash vapor, substantially no cumene is sent to the depropanizer column and thereafter recycled to the reactor system.

It must further be noted that the inventive process saves utilities. In the prior art all benzene is processed through the benzene column and is removed as a benzene column overhead vapor. The benzene vapor must therefore be condensed to liquid before it can be recycled to the reactor. However, since the benzene being recycled to the reactor must be heated to reactor temperature, a considerable heating expense is involved. In the present invention about one half of the recycle benzene is sent to the reactor from the depropanizer column at elevated temperature, thus resulting in a considerable saving on heat input to the process.

Other advantages in addition to those set forth hereinabove will be apparent to those skilled in the art.

While the embodiment set forth hereinabove has been specific to the manufacture of cumene by the inventive process, it must be realized that the present invention is also applicable to the manufacture of other alkylated aromatic hydrocarbons such as ethylbenzene. The inventive process may also be found to be effective in the separation of the effluent from the synthesis of other alkylated aromatic compounds, such as alkylphenols, in the presence of an unreactive vapor diluent.

It is to be noted that the operating conditions as set forth in the example are specific to that example and are in no way to be construed as limiting upon the process.

In the alkylation of aromatic compounds with an olefin-acting compound it is the art to provide a molar deficiency of the olefin. The molar deficiency of olefin-acting compound to alkylatable aromatic is maintained by holding an aromatic to olefin molar ratio in the range of from 2:1 to about 30:1 with a preferred range of 4:1 to about 16:1. This molar deficiency is required in order to minimize polyalkylation of the aromatic compound. When utilizing a solid phosphoric acid catalyst in the reaction zone, it is a particularly preferred embodiment that the ratio of aromatic to olefin should be about 8:1 when producing cumene and about 12:1 when producing ethylbenzene.

The temperature of the reaction zone may be from 300° F. to about 600° F. and when utilizing a solid phosphoric acid catalyst will normally range from 350° F. to 450° F. for cumene and 450° F. to 550° F. for ethylbenzene. The pressure of the alkylation reaction may be from 300 pounds per square inch to 1000 pounds per square inch or even higher. The liquid hourly space velocity of the reaction zone may range from 0.5 to 5.0, but will normally be in the range of 1.0 to 1.5. In addition, it is to be noted that the temperature rise across the catalyst beds of the example was maintained at 20° F. However, the conditions may be adjusted to allow a temperature rise of as much as 45° F. within the reaction zone. The specific reactor operating conditions which are required for the alkylation of any aromatic hydrocarbon or other alkylatable aromatic compound when utilizing a solid phosphoric acid catalyst or any other catalyst are readily ascertainable by those skilled in the art.

It must be noted that the rectified flash zone 9 was maintained at a temperature of 398° F. and 285 p.s.i.g. in the example given, but that these conditions are specific to the example. The conditions of temperature and pressure are adjusted to give the desired separation between liquid and vapor in the effluent. Preferably, these conditions will provide that about half of the benzene in the reactor effluent will flash into the vapor phase and half will remain in the liquid phase. However, the liquid-vapor split may be shifted up or down as desired by choice of the operating conditions. Thus, it is within the scope of the process of the present invention that the vapor phase may contain from about 10% to about 90% of the unreacted benzene while the liquid phase may correspondingly contain from about 90% to about 10% of the benzene.

The primary control of the separation of the effluent into liquid and vapor is the amount of pressure drop to which the effluent is subjected upon leaving the reactor and entering the rectified flash zone. As noted above, it is preferable that the pressure drop, or flashing, should provide that about half of the benzene is in the vapor phase and half is in the liquid phase. Although the reaction may occur at pressures in excess of 1000 p.s.i.g., little or no flashing of vapor would occur at such pressure in the rectified flash zone and since the cost of fabricating the vessel for the rectified flash would be excessive at such a pressure level it is advantageous to keep the pressure at about 500 p.s.i.g. or below. Since the vapor leaving the rectified flash zone must enter a subsequent fractionating column under elevated pressure, a depropanizer for cumene synthesis or a deethanizer for ethylbenzene synthesis, it is advantageous not to operate the rectified flash zone at a pressure which is below the pressure of the subsequent column. Thus, while the rectified flash zone could be maintained at a pressure in the range of from about 50 p.s.i.g. to 200 p.s.i.g., this would require that the flash vapor be condensed and pumped into the fractionating column. Therefore, the pressure within the rectified flash zone should be maintained in the range from 200 p.s.i.g. to about 500 p.s.i.g., and it is preferable that pressure only be sufficiently high to transfer the vapor into the subsequent column without mechanical assistance. Thus, it is preferable that the rectified flash zone be maintained at a pressure of from about 200 p.s.i.g. to 500 p.s.i.g., and more specifically that the pressure be maintained at from 225 p.s.i.g. to 300 p.s.i.g. when applied to cumene production.

The temperature within the rectified flash zone will be the flash point of the reactor effluent for the specific reactor effluent composition and for the specific pressure within the rectified flash zone. The temperature will always be below the reactor outlet temperature since the flashing of the effluent will cause a semi-adiabatic temperature drop. The temperature within the rectified flash zone will, therefore, normally be in the range of from about 250° F. to about 500° F., and will preferably be in the range of from 350° F. to about 425° F. for cumene production.

In addition, reflux to the rectified flash zone is to be controlled sufficiently to minimize alkylated benzene in the vapor leaving the rectified flash zone. It will be noted that in the example, the rectified flash zone was refluxed with depropanizer bottoms via line 26 and that this reflux stream comprises benzene. However, the inventive process has been operated and shown to be equally effective when using depropanizer overhead by taking a slip stream from line 20 in order to reflux the rectified flash zone. In addition, the reflux of the rectified flash zone may be accomplished in part with depropanizer bottoms and in part with depropanizer overhead. The source of the reflux to the rectified flash zone also may comprise, in part or in whole, the fresh benzene as a slip-stream from line 1, the benzene overhead as a slip stream from line 33, or the polyalkylated benzene as a slip stream from line 44. It is also to be noted that in the example described herein the reflux was hot (410° F.), while other sources of reflux would normally be at ambient temperature. The temperature of the reflux should not be construed to place a limit upon the inventive process. All that is required for the inventive process is that the source, temperature, and rate of reflux be established sufficiently to minimize the carryover of alkylated benzene in the vapor leaving via line 12.

The specific operating conditions within the rectified flash zone for any given reactor effluent composition are readily ascertainable by those skilled in the art utilizing the teachings which have been presented hereinabove.

It is to be noted that the fractionation section of the example comprises a depropanizer column, a benzene column, and a cumene column. The operating conditions within these fractionation columns are specific for the process set forth in the example, and the operating conditions which may be necessary for any other reactor effluent composition will be readily ascertainable by those skilled in the art. It is not therefore necessary within the description of this invention to discuss broad ranges which are required for such fractionation.

It must also be noted that in the example set forth, a solid phosphoric acid catalyst was used in reaction chamber 6 for alkylation of the aromatic. Since aromatic hydrocarbons leach water and phosphoric acid from such catalyst, provision must therefore be made for injection of water as indicated via line 45 in order to maintain the correct degree of hydration of the solid phosphoric acid catalyst. The method of adjusting such water injection is set forth in U.S. Patent 2,860,173 by E. K. Jones. In the example noted herein, a water injection rate of only 0.7 mol per hour or 1.45 gallons per hour is indicated. This rate takes into account the fact that fresh benzene entering the inventive process as well as the olefin stream will contain traces of water. It must be noted that where other catalyst systems are used in the inventive process such water injection and water removal from the process may not be necessary.

If the inventive process is utilized in producing alkylated aromatic compounds other than cumene, the process may be slightly modified. For example, in the synthesis of ethylbenzene from a feed comprising benzene, ethylene, and ethane, the overhead vapor from the rectified flash chamber 9 will pass via line 12 into a deethanizer column and the deethanizer overhead will comprise ethane. Since it is expensive to liquify ethane, reflux to the rectified flash chamber will not normally comprise highly pure liquid ethane and the recycle quench to the reactors via line 22 would not comprise liquified ethane. Reflux to the rectified flash chamber in such an embodiment would preferably comprise the deethanized bottoms stream containing benzene and quench to the reactor chamber via line 22 would comprise a recycle benzene stream rather than a recycle ethane stream. Similar modifications of the overall process may arise when the rectified flash zone is applied to a process for the alkylation of substituted aromatic compounds such as phenols.

The inventive process as set forth in the example above, wherein an alkylatable aromatic compound is alkylated by an olefin-acting compound, is equally applicable in the oligomerization of an olefin-acting compound in the presence of an unreactive vapor diluent wherein a desired oligomerized product is produced and partially-oligomerized product must be separated therefrom. For example, in the production of propylene-tetramer over a solid phosphoric acid catalyst the reactor effluent will comprise propane, propylene-dimer, propylene-trimer, propylene-tetramer, and propylene-pentamer. It is therefore necessary to depropanize the reactor effluent and to recycle the propylene-dimer and propylene-trimer to the reaction zone for further oligomerization with propylene to produce additional propylene-tetramer. It is also necessary to minimize the amount of product tetramer in the dimer-trimer fraction which is recycled, since the tetramer will oligomerize further with propylene to produce additional pentamer resulting in an additional product yield loss. It is readily apparent that by using the rectified flash zone of the inventive process, the benefits which have been set forth hereinabove for the synthesis of cumene will also be realized in the synthesis of propylene-tetramer. These benefits will also be realized in the synthesis of propylene-trimer where dimer must be recycled to the reaction zone without the recycle of product trimer.

The reactor conditions which are required for the synthesis of propylene-trimer and tetramer fractions are well-known in the art and it is not necessary to detail them herein. The conditions which are indicated hereinabove for the alkylation of aromatic hydrocarbon in the presence of solid phosphoric acid catalyst are equally applicable to the oligomerization of olefins, with the exception that the temperature rise in the reaction zone may be held to a 100° F. maximum.

Since the reactor effluent composition will be dependent upon the ratio of olefin to paraffinic diluent in the reactor feed and the degree of oligomerization in the reactor, as effected by the specific operating conditions in the reaction zone, it is not possible to set forth specific operating conditions for a rectified flash zone as applied to an oligomerization process. The necessary conditions, however, are readily ascertainable by those skilled in the art by discriminately utilizing the teachings which have been presented hereinabove in reference to the operating conditions of the rectified flash zone in the synthesis of cumene.

The invention claimed:

1. Process which comprises alkylating an alkylatable aromatic compound with a molar deficiency of olefin-acting compound in a reaction zone in the presence of an unreacted vapor diluent; passing the total alkylation effluent into a rectified flash zone under conditions sufficient to separate said diluent and a part of unreacted alkylatable aromatic compound from alkylated aromatic compound; returning at least a portion of unreacted alkylatable aromatic compound to the reaction zone; and recovering alkylated aromatic compound in high concentration.

2. Process of claim 1 wherein said rectified flash zone is refluxed with a material selected from the group consisting of alkylatable aromatic compound, unreactive vapor diluent, alkylated aromatic compound, and mixtures of unreactive vapor diluent and alkylatable aromatic compound.

3. Process of claim 1 wherein said alkylatable aromatic compound comprises benzene, said olefin-acting compound comprises ethylene, said unreactive vapor diluent comprises ethane, and said alkylated aromatic compound comprises ethylbenzene.

4. Process of claim 1 wherein said alkylatable aromatic compound comprises benzene, said olefin-acting compound comprises propylene, said unreactive vapor diluent comprises propane, and said alkylated aromatic compound comprises cumene.

5. Process of claim 4 wherein said rectified flash zone is maintained at a temperature in the range of from about 250° F. to about 500° F. and at a pressure in the range of from about 200 p.s.i.g. to about 500 p.s.i.g.

6. Process which comprises oligomerizing an olefin-acting compound in a reaction zone in the presence of an unreactive vapor diluent; passing the total oligomerization effluent into a rectified flash zone under conditions sufficient to separate said diluent and a part of partially-oligomerized product from oligomerized product; returning at least a portion of partially-oligomerized product to the reaction zone; and recovering oligomerized product in high concentration.

7. Process of claim 6 wherein said rectified flash zone is refluxed with a material selected from the group consisting of unreactive vapor diluent, partially-oligomerized product, oligomerized product, and mixtures of unreactive vapor diluent and partially-oligomerized product.

8. Process of claim 6 wherein said olefin-acting compound comprises propylene and said unreactive vapor diluent comprises propane.

9. Process of claim 8 wherein said oligomerized product comprises propylene-trimer.

10. Process of claim 8 wherein said oligomerized product comprises propylene-tetramer.

References Cited

UNITED STATES PATENTS

| 2,778,862 | 1/1957 | Gorham et al. | 260—671 |
| 2,863,931 | 12/1958 | Summers | 260—683.15 |
| 2,945,072 | 7/1960 | Joris | 260—671 |

DELBERT E. GANTZ, *Primary Examiner.*

C. R. DAVIS, *Assistant Examiner.*

U.S. Cl. X.R.

260—674, 683.15